(12) United States Patent
Liu

(10) Patent No.: US 8,322,622 B2
(45) Date of Patent: Dec. 4, 2012

(54) HAND-SUPPORTABLE DIGITAL-IMAGING BASED CODE SYMBOL READING SYSTEM SUPPORTING MOTION BLUR REDUCTION USING AN ACCELEROMETER SENSOR

(75) Inventor: Yong Liu, Suzhou (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 12/942,174

(22) Filed: Nov. 9, 2010

(65) Prior Publication Data
US 2012/0111942 A1 May 10, 2012

(51) Int. Cl.
G06K 7/015 (2006.01)
(52) U.S. Cl. ............... 235/462.48; 235/472.01
(58) Field of Classification Search ...... 235/462.01–473
See application file for complete search history.

(56) References Cited

U.S. PATENT DOCUMENTS

| | | |
|---|---|---|
| 4,970,540 A | 11/1990 | Vasey et al. |
| 5,012,270 A | 4/1991 | Sekine et al. |
| 5,107,293 A | 4/1992 | Sekine et al. |
| 5,117,246 A | 5/1992 | Takahashi et al. |
| 5,153,633 A | 10/1992 | Otani |
| 5,170,205 A | 12/1992 | Satoh et al. |
| 5,175,580 A | 12/1992 | Shiomi |
| 5,189,518 A | 2/1993 | Nishida |
| 5,210,563 A | 5/1993 | Hamada et al. |
| 5,585,875 A | 12/1996 | Imafuji et al. |
| 5,587,737 A | 12/1996 | Sekine et al. |
| 5,619,030 A | 4/1997 | Shiomi |
| 5,883,733 A | 3/1999 | Hwang |
| 5,978,600 A | 11/1999 | Takeuchi et al. |
| 6,619,549 B2 | 9/2003 | Zhu et al. |
| 6,924,837 B2 | 8/2005 | Wakui |
| 7,110,024 B1 | 9/2006 | Silverbrook et al. |

(Continued)

FOREIGN PATENT DOCUMENTS
WO    WO 02/43195 A2    5/2002

OTHER PUBLICATIONS
Sensor Products MMA7260Q, Freescale Semiconductor, 2 pages, 2005.

Primary Examiner — Thien M. Le
Assistant Examiner — Christle Marshall
(74) Attorney, Agent, or Firm — Thomas J. Perkowski, Esq.

(57) ABSTRACT

A digital-imaging based code symbol reading system which automatically detects hand-induced vibration when the user attempts to read one or more 1D and/or 2D code symbols on an object, and controls system operation in order to reduce motion blur in digital images captured by the hand-supportable system, whether operated in a snap-shot or video image capture mode. An accelerometer sensor is used to automatically detect hand/system acceleration in a vector space during system operation. In a first embodiment, digital image capture is initiated when the user manually depresses a trigger switch, and decode processed only when the measured acceleration of the hand-supportable housing is below predetermined acceleration threshold levels. In another embodiment, digital image capture is initiated when an object is automatically detected in the field of view of the system, and decode processed only when the measured acceleration of the hand-supportable housing is below predetermined acceleration threshold levels.

17 Claims, 10 Drawing Sheets

U.S. PATENT DOCUMENTS

| | | |
|---|---|---|
| 7,128,266 B2 | 10/2006 | Zhu et al. |
| 7,382,400 B2 | 6/2008 | Sablak |
| 7,515,191 B2 | 4/2009 | Tanaka |
| 7,539,403 B2 | 5/2009 | Endo |
| 7,565,068 B2 | 7/2009 | Endo |
| 7,657,164 B2 | 2/2010 | Nomura et al. |
| 7,710,458 B2 | 5/2010 | Yuyama et al. |
| 2005/0236488 A1* | 10/2005 | Kricorissian ............ 235/472.01 |
| 2006/0083507 A1 | 4/2006 | Endo |
| 2006/0238621 A1 | 10/2006 | Okubo |
| 2007/0064115 A1 | 3/2007 | Nomura et al. |
| 2008/0296388 A1* | 12/2008 | Drzymala et al. ....... 235/462.42 |
| 2008/0314985 A1 | 12/2008 | Kotlarsky et al. |
| 2009/0294541 A1* | 12/2009 | Nunnink ...................... 235/470 |
| 2010/0078479 A1 | 4/2010 | Epshteyn |

* cited by examiner

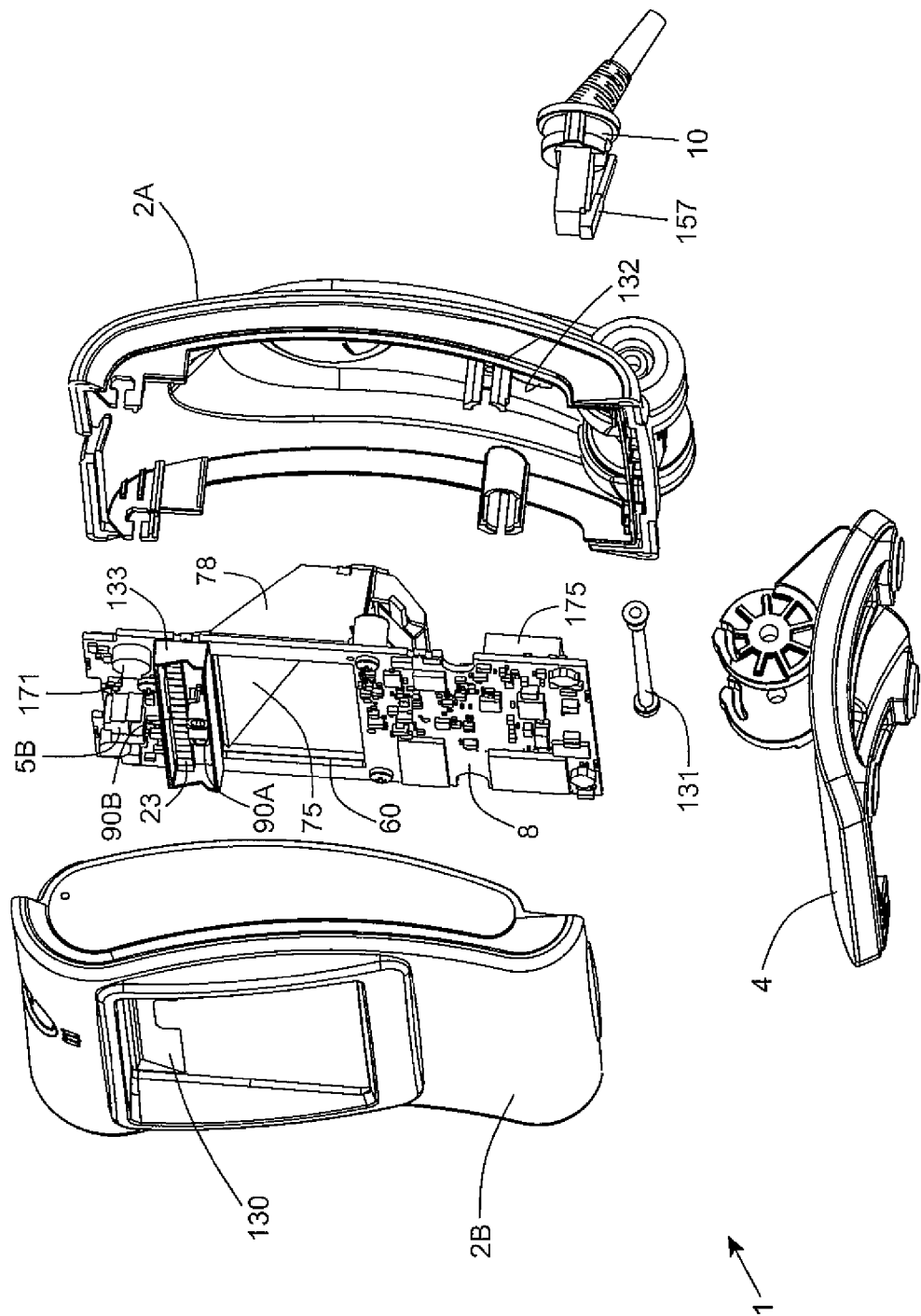

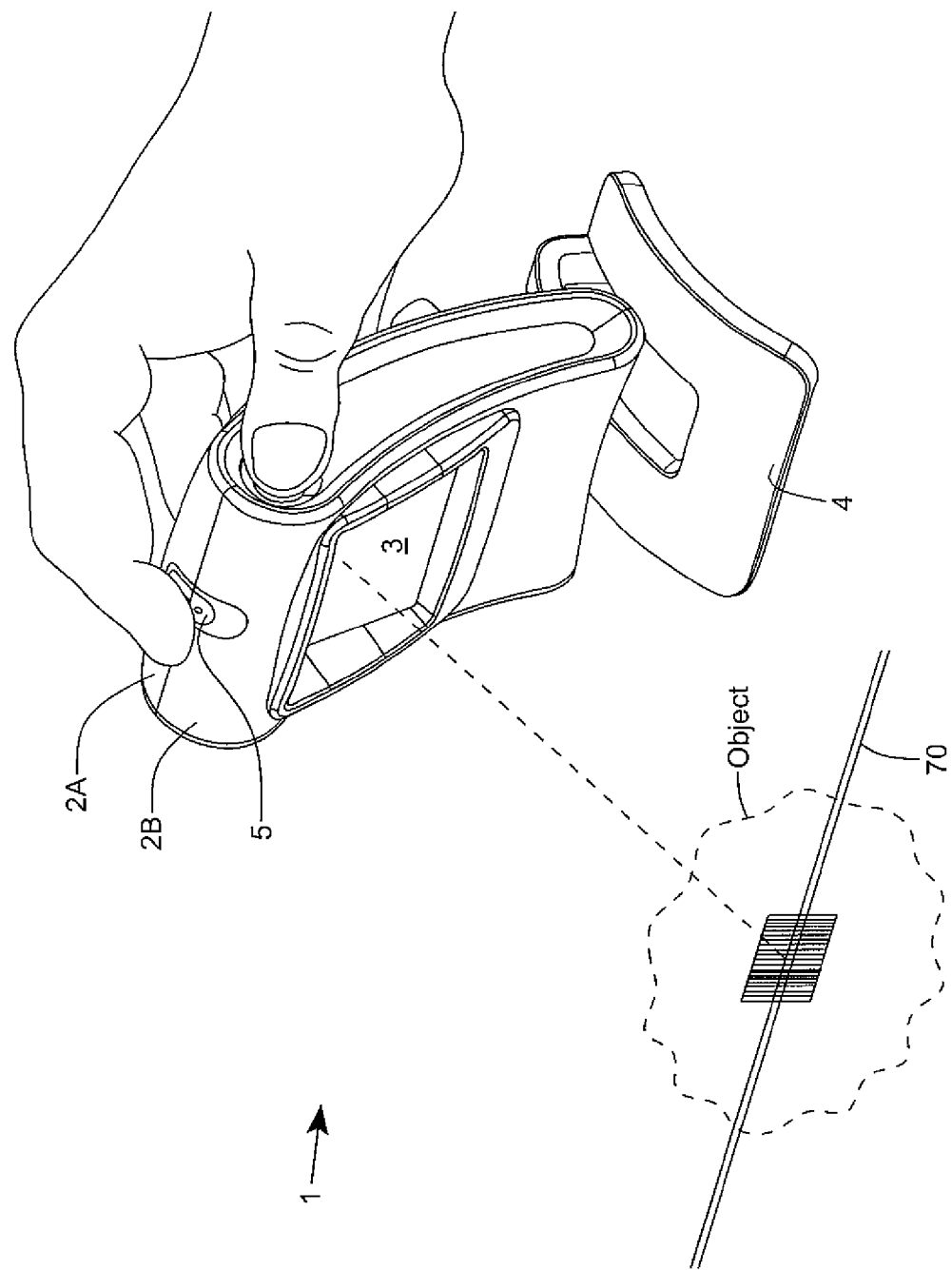

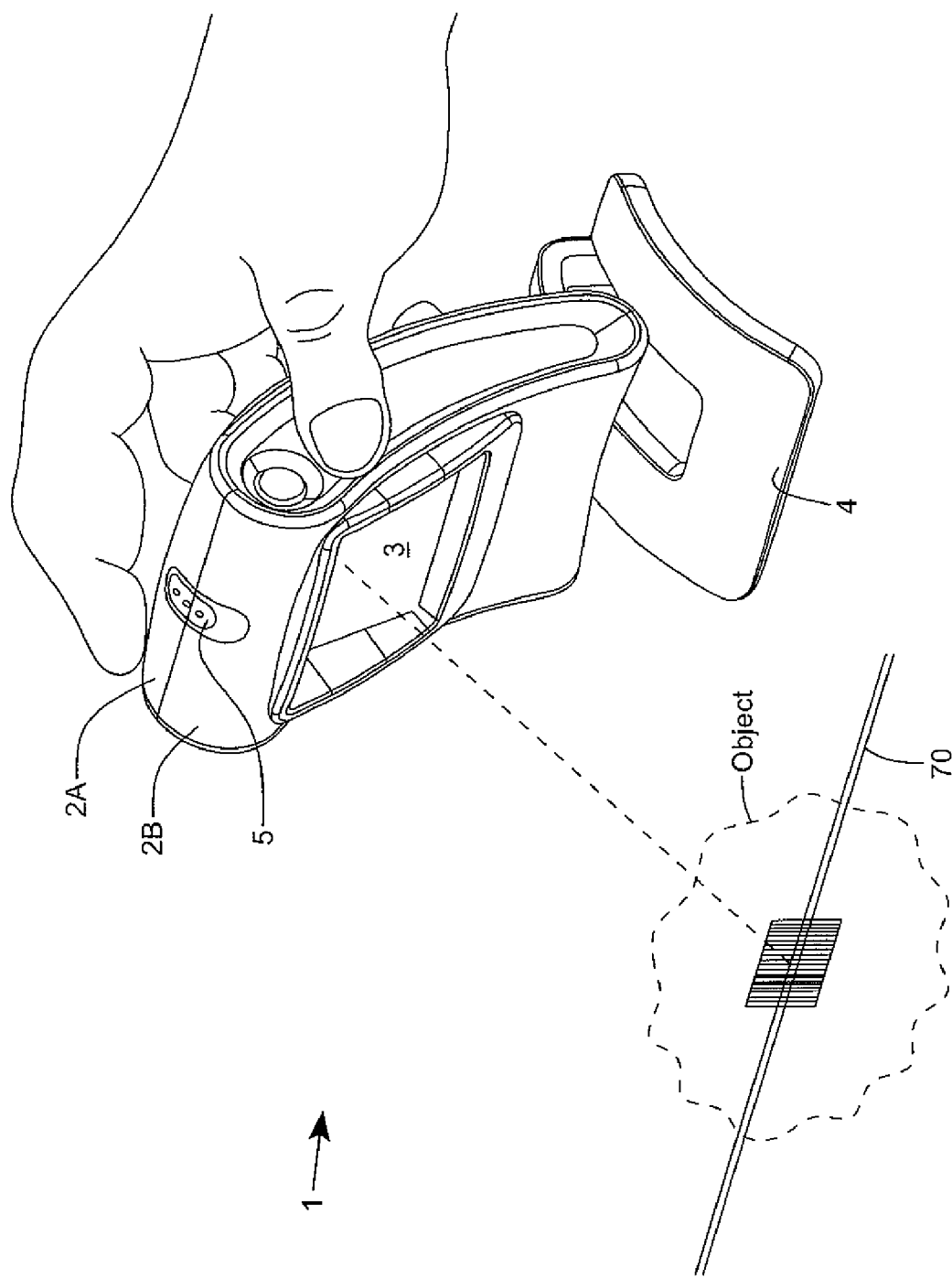

HAND-SUPPORTABLE DIGITAL-IMAGING BASED CODE SYMBOL READING SYSTEM SUPPORTING MOTION BLUR REDUCTION USING AN ACCELEROMETER SENSOR

BACKGROUND

1. Field

The present disclosure relates to a new and improved digital-imaging based code symbol reading system and method of operating the same in both hand-held and hands-free modes of operation.

2. Brief Description of the State of the Art

In most handheld digital imaging systems, motion blur occurs when an image is taken while the hand holding the system is vibrating or shaking, during the integration period of imaging system. Such motion blur occurs in such captured images even when the vibration is slight and not readily observable to the human eye.

A variety of methods have been developed and disclosed in the following Patents and Patent Application Publications to reduce motion blur in camera-type hand-held imaging systems: U.S. Pat. Nos. 6,924,837; 7,539,403; 7,565,068; and 7,657,164; and US Patent Publication Nos. 2006/0238621 and 2010/0078479.

However, none of these prior art systems provide a simple and reliable way for a hand-supportable imaging-based bar code symbol reader to prevent the introduction of motion blur into the digital images of bar code symbols to be read by the system, caused by the vibration, shaking and/or movement of the hand of the system operator.

Thus, there is great need in the art for new and improved ways of preventing the introduction of motion blur into the digital images of bar and other code symbols to be read by the system, while avoiding the complexities, shortcomings and drawbacks of the prior art methods and apparatus.

OBJECTS AND SUMMARY

A primary object is to provide a new and improved digital-imaging based code symbol reading system with integrated motion blur reduction subsystem employing an accelerometer sensor.

Another object of the present invention is to provide such a digital-imaging based code symbol reading system which automatically detects hand-induced vibration when the user attempts to read one or more 1D and/or 2D code symbols on an object, and controls system operation in order to reduce motion blur in digital images captured by the hand-supportable system.

Another object of the present invention is to provide such a digital-imaging based bar code symbol reading system, wherein an accelerometer sensor is used to automatically detect hand/system acceleration in a vector space during system operation.

Another object of the present invention is to provide such a digital-imaging based bar code symbol reading system, wherein digital image capture is initiated when the user manually depresses a trigger switch, and decode processed only when the measured acceleration of the hand-supportable housing is below predetermined acceleration threshold levels.

Another object of the present invention is to provide such a digital-imaging based bar code symbol reading system, wherein digital image capture is initiated when an object is automatically detected in the field of view of the system, and decode processed only when the measured acceleration of the hand-supportable housing is below predetermined acceleration threshold levels.

Another object of the present invention is to provide such a digital-imaging based bar code symbol reading system that supports both video and snap-shot modes of image detector operation.

These and other objects will become apparent hereinafter and in the Claims.

BRIEF DESCRIPTION OF THE DRAWINGS

In order to more fully understand the Objects, the following Detailed Description of the Illustrative Embodiments should be read in conjunction with the accompanying Drawings, wherein:

FIG. 2B is a second perspective/exploded view of the digital-imaging based bar code symbol reading system of the illustrative embodiment shown in FIG. 1;

FIG. 4A is a perspective view of the digital-imaging based bar code symbol reading system of the illustrative embodiment shown held in the hand of a user attempting to read a bar code symbol on an object, while the system is operated in its manually-triggered mode of bar code symbol reading operation;

FIG. 4B is a perspective view of the digital image capture and processing system of the illustrative embodiment shown held in the hand of a user attempting to read a bar code symbol on an object, while the system is operated in its automatically-triggered mode of bar code symbol reading operation;

DETAILED DESCRIPTION OF THE ILLUSTRATIVE EMBODIMENTS

Figure 1:
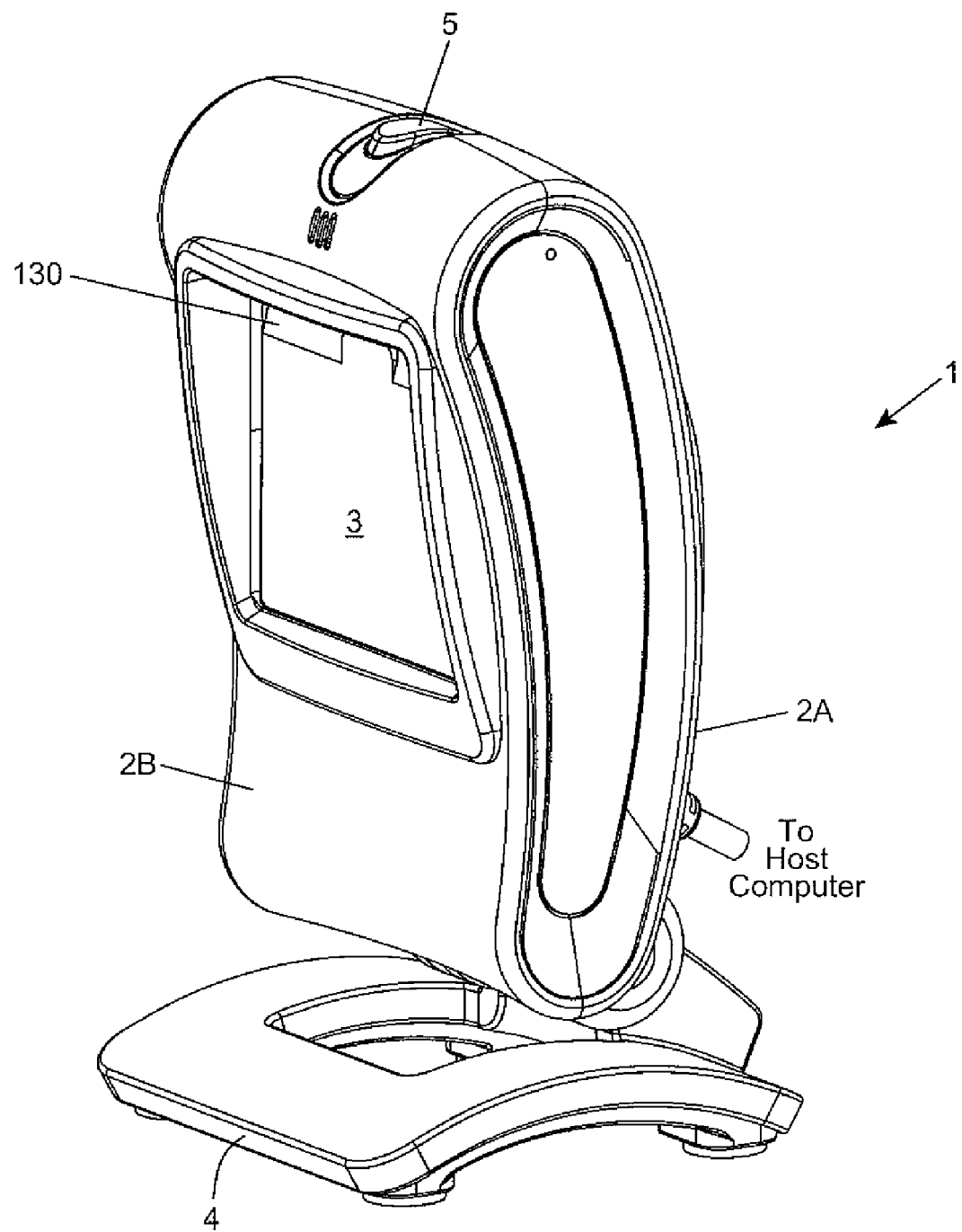
FIG. 1 is a perspective view of an illustrative embodiment of the digital-imaging based bar code symbol reading system, supporting both manually-triggered and automatically-triggered modes of hand-supported and countertop-supported bar code symbol reading operation.

Referring to the figures in the accompanying Drawings, the illustrative embodiments of the digital imaging-based bar code symbol reading system will be described in greater detail, wherein like elements will be indicated using like reference numerals.

Figure 2A:
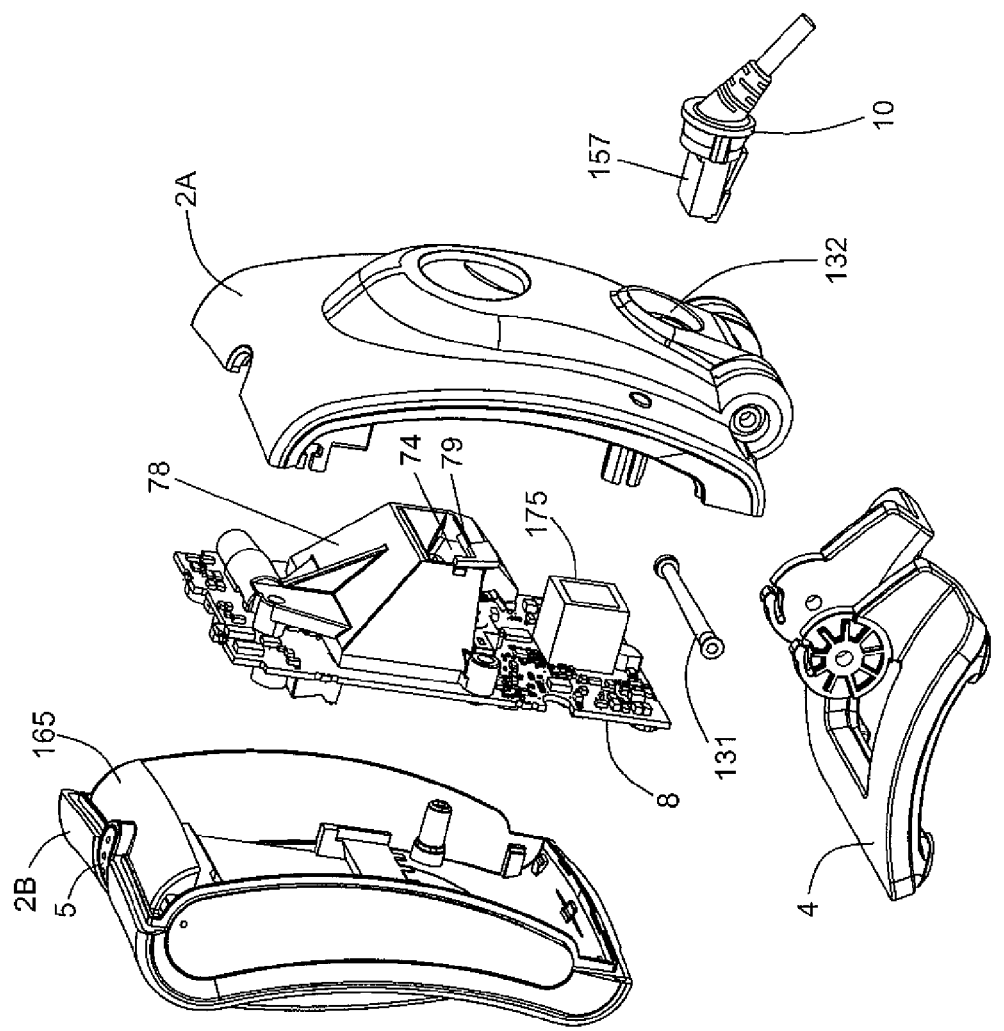
FIG. 2A is a first perspective/exploded view of the digital-imaging based bar code symbol reading system of the illustrative embodiment depicted in FIG. 1, showing its printed circuit board assembly arranged between the front and rear portions of the system housing, with the hinged base being pivotally connected to the rear portion of the system housing by way of an axle structure.
Figure 3:
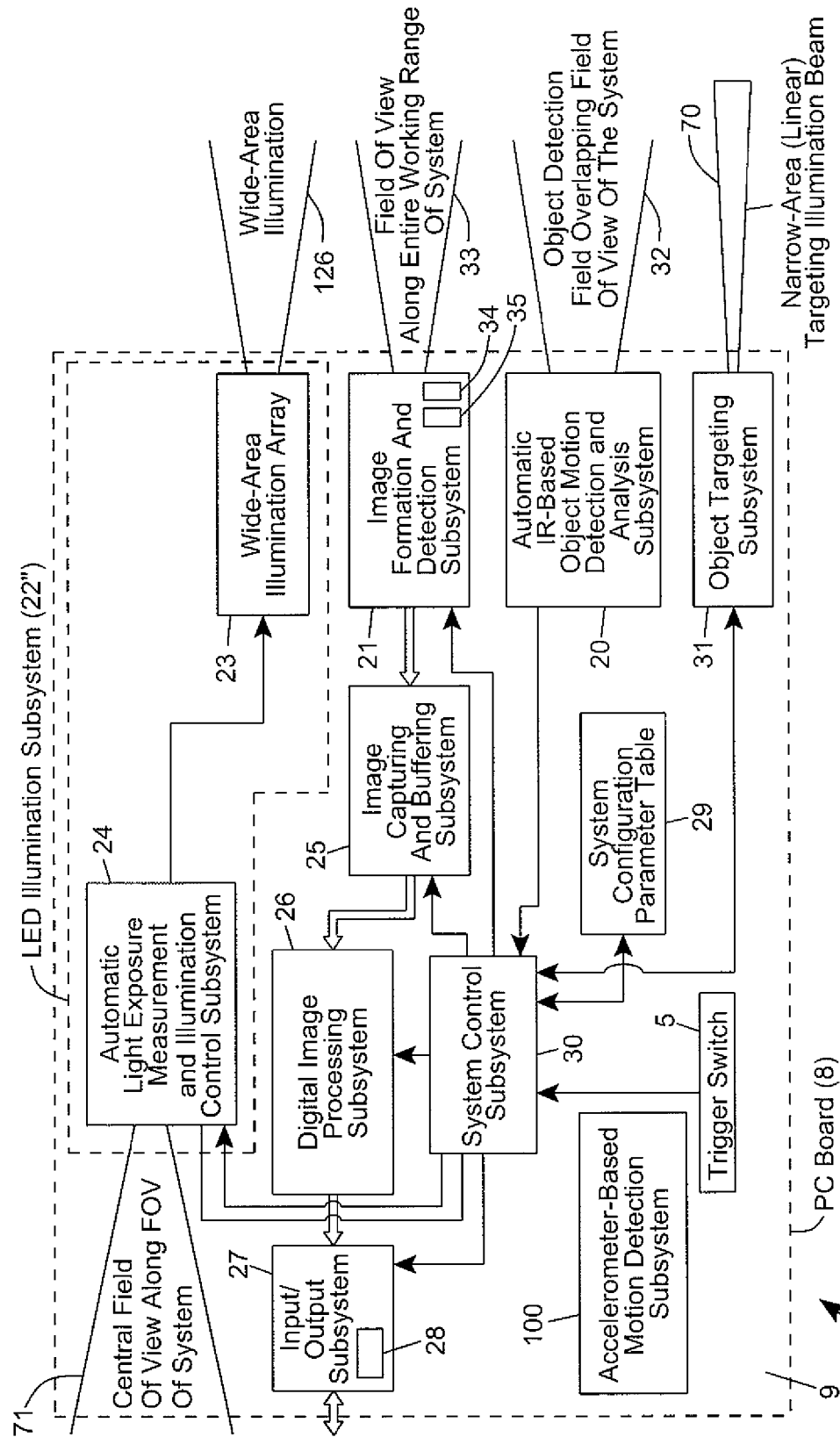
FIG. 3 is a schematic block diagram describing the major system components of the digital-imaging based bar code symbol reading system illustrated in FIGS. 1 through 2B.

Referring now to FIGS. 1 through 3, an illustrative embodiment of the hand-supportable digital-imaging based bar code symbol reading system 1 will be described in detail.

As shown in FIGS. 1, 2A and 2B, the digital-imaging based bar code symbol reading system of the illustrative embodiment 1 comprises: a hand-supportable housing 2 having (i) a front housing portion 2B with a window aperture 6 and an imaging window panel 3 installed therein; and (ii) a rear housing portion 2A. As shown, a single PC board based optical bench 8 (having optical subassemblies mounted thereon) is supported between the front and rear housing portions 2A and 3B which, when brought together, form an assembled unit. A base portion 4 is connected to the assembled unit by way of a pivot axle structure 131 that passes through the bottom portion of the imager housing and the base portion so that the hand-supportable housing and base portion are able to rotate relative to each other. The host/imager interface cable 10 passes through a port 132 formed in the rear of the rear housing portion, and interfaces with connectors mounted on the PC board 8.

The hand-supportable digital-imaging based bar code symbol reading system 1 can be used in both hand-supportable and counter-top supportable modes of operation. When operated in its manually-triggered hand-supportable mode of operation, as shown in FIG. 4A, the system supports first and second manually-triggered modes of bar code symbol reading operation, specified in FIGS. 5 and 6, respectively. When operated in its automatically-triggered hand-supportable mode of operation, as shown in FIG. 4B, the system supports first and second automatically-triggered modes of bar code symbol reading operation, specified in FIGS. 7 and 8, respectively. When operated in its counter-top supportable mode of operation, the system supports an automatically-triggered mode of bar code symbol reading operation, allowing for full hands-free operation.

As shown in FIG. 3, the digital-imaging based bar code symbol reading system 1 comprises a number of subsystem components, namely: an image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based illumination subsystem 22 employing a single LED illumination array 32 for producing a field of narrow-band wide-area illumination 126 within the entire FOV 33 of the image formation and detection subsystem 21, which is reflected from the illuminated object and transmitted through a narrow-band transmission-type optical filter 40 realized within the hand-supportable and detected by the image detection array 35, while all other components of ambient light are substantially rejected; an object targeting illumination subsystem 31 as described hereinabove; an IR-based object motion detection and analysis subsystem 20 for producing an IR-based object detection field 32 within the FOV of the image formation and detection subsystem 21; an automatic light exposure measurement and illumination control subsystem 24 for controlling the operation of the LED-based illumination subsystem 22; an image capturing and buffering subsystem 25 for capturing and buffering 2-D images detected by the image formation and detection subsystem 21: a digital image processing subsystem 26 for processing 2D digital images captured and buffered by the image capturing and buffering subsystem 25 and reading 1D and/or 2D bar code symbols represented therein; an accelerometer-based (housing) motion detection subsystem 100 employing a 3-axis low g acceleration sensor chip (e.g. Freescale Semiconductor's MMA7260Q acceleration sensor chip); and an input/output subsystem 27 for outputting processed image data and the like to an external host system or other information receiving or responding device; and a system control subsystem 30 integrated with the subsystems above, for controlling and/or coordinating these subsystems during system operation.

The primary function of the object targeting subsystem 31 is to automatically generate and project a visible linear-targeting illumination beam 70 across the central extent of the FOV of the system in response to either (i) the automatic detection of an object during hand-held imaging modes of system operation, or (ii) manual detection of an object by an operator when s/he manually actuates the manual actuatable trigger switch 5. In order to implement the object targeting subsystem 31, the OCS assembly 78 also comprises a fourth support structure for supporting the pair of beam folding mirrors above a pair of aperture slots, which in turn are disposed above a pair of visible LEDs arranged on opposite sites of the FOV optics 34 so as to generate a linear visible targeting beam 70 that is projected off the second FOV folding 75 and out the imaging window 3, as shown and described in detail in US Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about the object therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 133, below the linear array of LEDs 23. The IR LED 90A and IR photodiode 90B are used to implement the automatic IR-based object motion detection and analysis subsystem 20.

The image formation and detection (i.e. camera) subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations.

The primary function of the LED-based illumination subsystem 22 is to produce a wide-area illumination field 36 from the LED array 23 when an object is automatically detected within the FOV. Notably, the field of illumination has a narrow optical-bandwidth and is spatially confined within the FOV of the image formation and detection subsystem 21 during modes of illumination and imaging, respectively. This arrangement is designed to ensure that only narrow-band illumination transmitted from the illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35, thereby providing improved SNR, thus improving the performance of the system.

The narrow-band transmission-type optical filter subsystem 40 is realized by (1) a high-pass (i.e. red-wavelength reflecting) filter element embodied within at the imaging window 3, and (2) a low-pass filter element mounted either before the CMOS area-type image detection array 35 or anywhere after beyond the high-pass filter element, including being realized as a dichroic mirror film supported on at least one of the FOV folding mirrors 74 and 75, shown in FIGS. 2A and 2B.

As shown in FIG. 2B, the linear array of LEDs 23 is aligned with an illumination-focusing lens structure 130 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 130 is to focus illumination from the single linear array of LEDs 23, and to uniformly illuminate objects located anywhere within the working distance of the FOV of the system.

As shown in FIG. 2B, an optically-opaque light ray containing structure 133 is mounted to the front surface of the PC board 8, about the linear array of LEDs 23. The function of the optically-opaque light ray containing structure 133 is to prevent transmission of light rays from the LEDs to any surface other than the rear input surface of the illumination-focusing lens panel 3, which uniformly illuminates the entire FOV of the system over its working range. When the front and rear housing panels 2B and 2A are joined together, with the PC board 8 disposed therebetween, the illumination-focusing lens panel 3 sits within slanted cut-aways formed in the top surface of the side panels, and illumination rays produced from the linear array of LEDs 23 are either directed through the rear surface of the illumination-focusing lens panel 3 or absorbed by the black colored interior surface of the structure 133.

As shown in FIGS. 2A and 2B, the optical component support (OCS) assembly 78 comprises: a first inclined panel for supporting the FOV folding mirror 74 above the FOV forming optics, and a second inclined panel for supporting the second FOV folding mirror 75 above the light transmission aperture 60. With this arrangement, the FOV employed in the image formation and detection subsystem 21, and originating from optics supported on the rear side of the PC board, is folded twice in space, and then projected through the light transmission aperture and out of the imaging window of the system.

The automatic light exposure measurement and illumination control subsystem 24 performs two primary functions: (1) to measure, in real-time, the power density [joules/cm] of photonic energy (i.e. light) collected by the optics of the system at about its image detection array 35, and to generate auto-exposure control signals indicating the amount of exposure required for good image formation and detection; and (2) in combination with the illumination array selection control signal provided by the system control subsystem 30, to automatically drive and control the output power of the LED array 23 in the illumination subsystem 22, so that objects within the FOV of the system are optimally exposed to LED-based illumination and optimal images are formed and detected at the image detection array 35. The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector 81, which is operated independently from the area-type image sensing array, schematically depicted in FIG. 3 by reference numeral 35.

The primary function of the image capturing and buffering subsystem 25 is (1) to detect the entire 2-D image focused onto the 2D image detection array 35 by the image formation optics 34 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in US Patent Application Publication No. US20080314985 A1, incorporated herein by reference in its entirety.

The primary function of the digital image processing subsystem 26 is to process digital images that have been captured and buffered by the image capturing and buffering subsystem 25, during modes of illumination and operation. Such image processing operations include image-based bar code decoding methods as described in U.S. Pat. No. 7,128,266, incorporated herein by reference in its entirety.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in their entirety.

The primary function of the system control subsystem 30 is to provide some predetermined degree of control, coordination and/or management signaling services to each subsystem component integrated within the system, as shown. While this subsystem can be implemented by a programmed microprocessor, in the preferred embodiments of the present invention, this subsystem is implemented by the three-tier software architecture supported on micro-computing platform shown in FIGS. 3 and 13, and described in U.S. Pat. No. 7,128,266, and elsewhere hereinafter.

The primary function of the manually-activatable trigger switch 5A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations. Notably, such SCPs can be dynamically managed as taught in great detail in copending US Patent No. US20080314985 A1, incorporated herein by reference in its entirety.

The primary function of the accelerometer-based motion detection subsystem 100 is to automatically perform real-time hand/housing acceleration measurements using an accelerometer sensor specified above, and then to provide such acceleration measurements to system control subsystem 30, which automatically carries out a particular scheme of bar code symbol reading control, using such hand/housing measurements and preset acceleration thresholds, to eliminate or otherwise substantially reduce motion blur in digitally captured images of bar code symbols to be decoded and processed by subsystem 26.

Methods of Bar Code Symbol Reading Operation Supporting Reduction of Motion Blur in Digital Images Captured by the Digital-Imaging Based Bar Code Symbol Reading of the Illustrative Embodiment During bar code symbol reading control operations, one or more accelerometer sensors provided in the subsystem 100 are used to detect hand acceleration within a vector space. The level of hand vibration or shake can be represented by acceleration of the hand, or rather the hand-supportable housing of the system held in the hand of its user. During system set-up operations, an acceleration threshold is defined in vector space (in system memory) for the stationary hand condition. When hand/housing acceleration is lower than the particular threshold defined at given measuring period, there is an assumption that there is substantially no or little hand-vibration at the time of the measuring period. When a hand, holding the digital-imaging based bar code symbol reading system 1, is substantially static (i.e. not moving or being shaken) during a hand-vibration measuring period, the acceleration should measure close to zero. When the hand/housing is moving during the hand-vibration measuring period, the acceleration should measure some non-zero value. Each time a bar code symbol is to be read using the digital-imaging based bar code symbol reading system 1, real-time hand/housing acceleration measurements are automatically performed by acceleration-based motion detection subsystem 100 and provided to control subsystem 30, which automatically carries out a particular scheme of bar code symbol reading control designed to eliminate or otherwise substantially reduce motion blur in digitally captured images of bar code symbols to be decoded processed by subsystem 26. Several exemplary methods for bar code symbol reading operation, supporting reduced motion blur in digitally captured images, are described in detail below.

Manually-Triggered Methods of Bar Code Symbol Reading Operation

In FIG. 4A, the digital-imaging based system 1 is shown generating and projecting its linear targeting illumination beam 70 into the FOV 33 of the system, in response to the automatic detection of an object within the FOV of the system, using the IR beam generated by the automatic IR-based motion detection and analysis subsystem 20. During this linear targeting mode of operation, a pair of substantially planarized illumination beams are generated about the FOV optics 34 on the PC board of the system, reflected off the FOV folding mirror 75, and ultimately projected out into the central portion of the FOV, as a single linear targeting illumination beam 70 having high visibility characteristics to human beings.

When reading bar-coded objects such as consumer products, the user simply aligns the automatically-generated targeting illumination beam 70 with the barcode symbol on the object, and then depresses the image capture/decode trigger 5A. In response thereto, subsystems 21, 25, and 26 cooperate under the control of subsystem 30 to capture, buffer and process a digital image of the FOV (and all that it encompasses) in an effort to read the bar code symbol on the object, using the manually-triggered process shown in FIG. 5 or 6. When the bar code symbol is read, subsystem 27 transmits symbol character data to the host system.

When reading bar-coded menus, the automatically-generated linear targeting beam is used to generally indicate the scope of the field of view (FOV) of the system. The targeting beam helps the user to position a barcode menu within the FOV, and when a particular barcode symbol is aligned with the visible targeting beam 70, the user can depress the image capture/decode button 5A, to capture and process a digital image of the FOV (and all that it encompasses) in effort to read the barcode symbol on the bar code symbol menu, using the manually-triggered process shown in FIG. 5 or 6.

Figure 5:
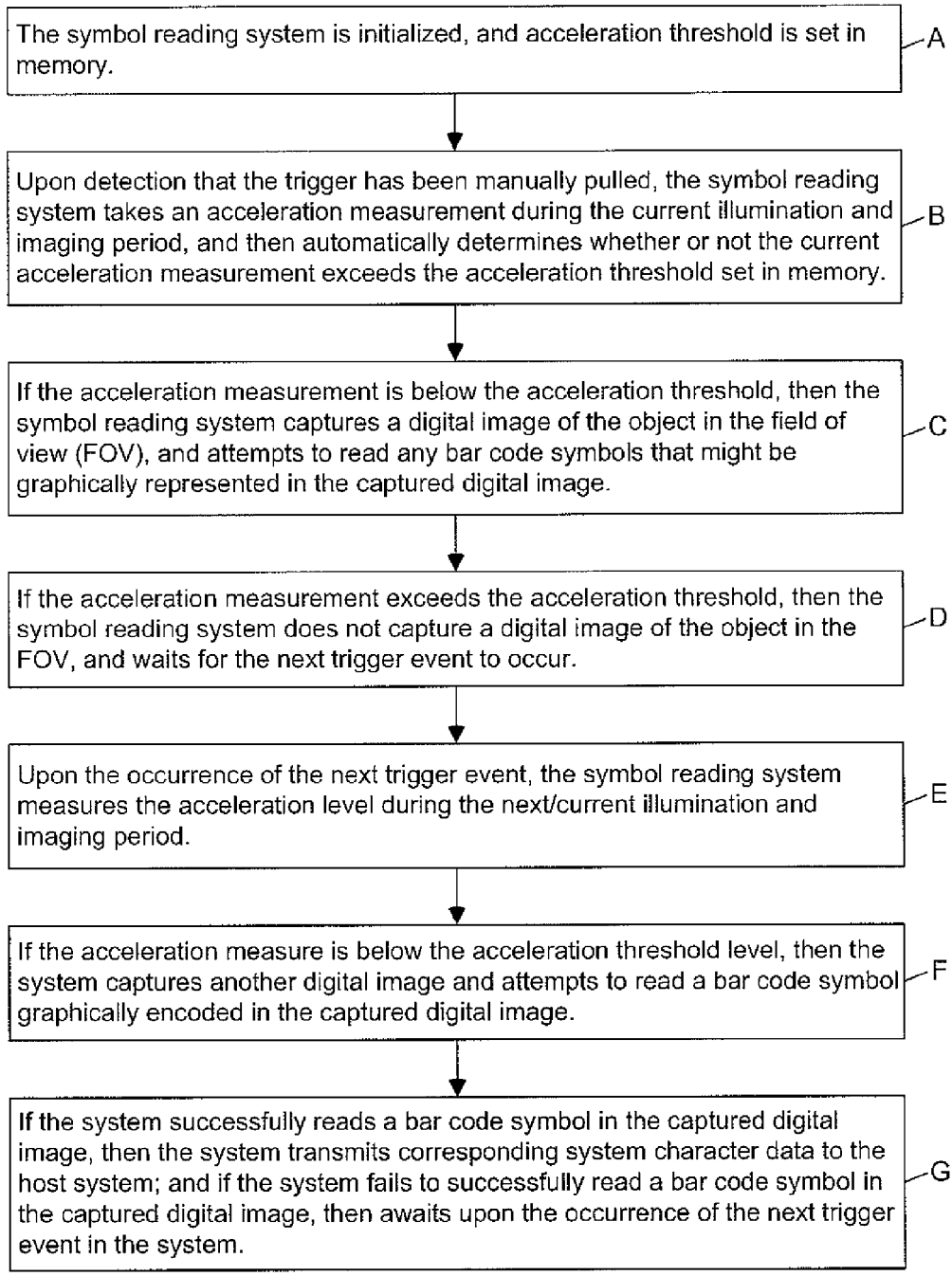
FIG. 5 is a flow chart setting forth the steps involved in carrying out the first method of a manually-triggered bar code symbol reading operation, supported during the hand-supportable bar code reading mode of the system shown in FIG. 1.

First Method of Manually-Triggered Bar Code Symbol Reading Supported by the Digital-Imaging Based Code Symbol Reading System In FIG. 5, there is shown a first method of manually-triggered bar code symbol reading supported by the digital-imaging based system 1.

STEP 1: The symbol reading system is initialized, and the acceleration threshold is set in memory. The acceleration threshold can be measured in units of $[m/s^2]$, or equivalent units of measurement.

STEP 2: Upon detection that the trigger has been manually pulled, the symbol reading system takes an acceleration measurement during the current illumination and imaging period, and then automatically determines whether or not the current acceleration measurement exceeds the acceleration threshold set in memory.

STEP 3: If the acceleration measurement is below the acceleration threshold, then the symbol reading system captures a digital image of the object in the field of view (FOV), and attempts to read any bar code symbols that might be graphically represented in the captured digital image.

STEP 4: If the acceleration measurement exceeds the acceleration threshold, then the symbol reading system does not capture a digital image of the object in the FOV, and waits for the next trigger event to occur.

STEP 5: Upon the occurrence of the next trigger event, the symbol reading system measures the acceleration level during the next/current illumination and imaging period.

STEP 6: If the acceleration measure is below the acceleration threshold level, then the system captures another digital image and attempts to read a bar code symbol graphically encoded in the captured digital image.

STEP 7: If the system successfully reads a bar code symbol in the captured digital image, then the system transmits corresponding symbol character data to the host system; and if the system fails to successfully read a bar code symbol in the captured digital image, then it awaits the occurrence of the next trigger event in the system.

Figure 6:
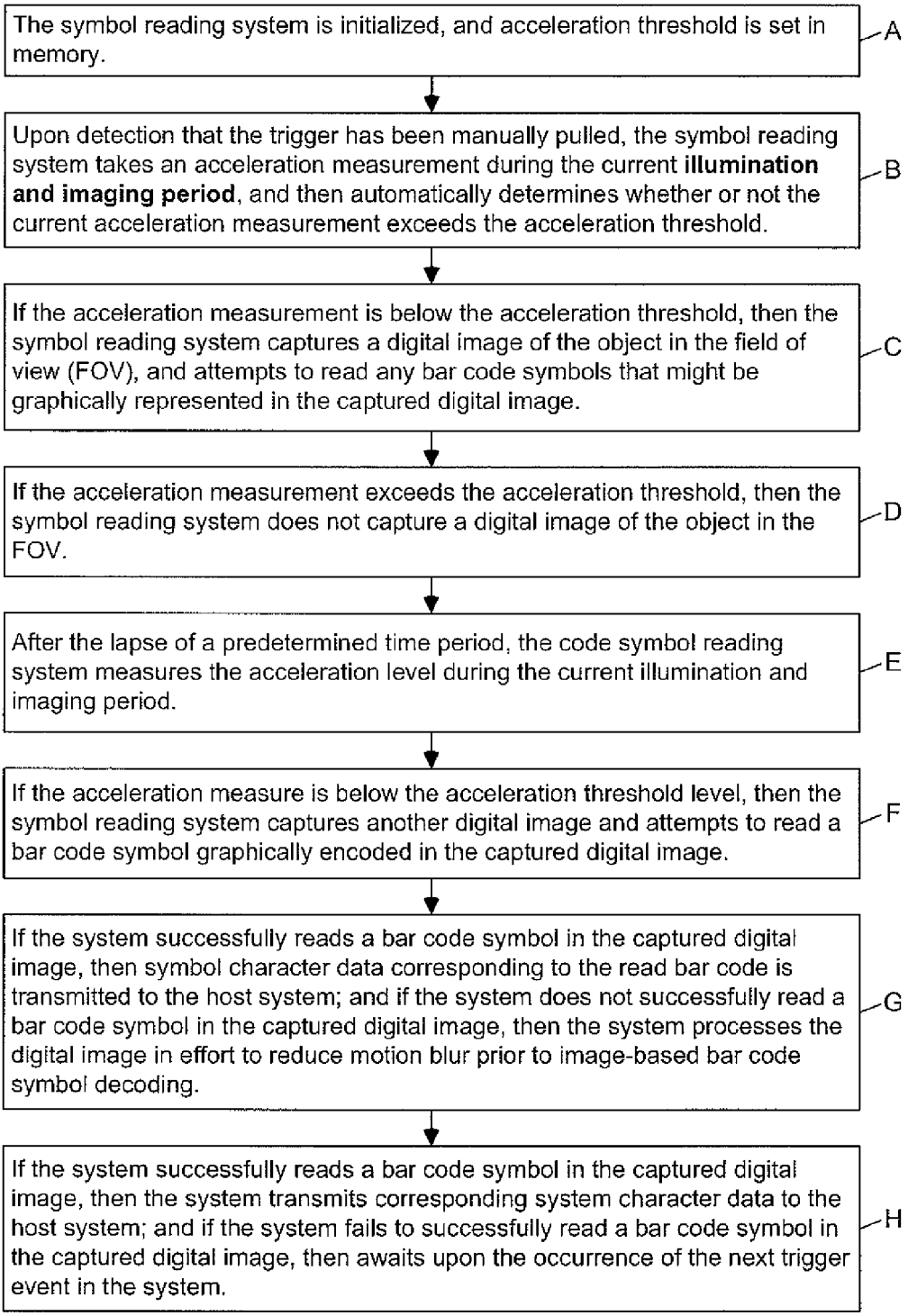
FIG. 6 is a flow chart setting forth the steps involved in carrying out the second method of manually-triggered bar code symbol reading operation, supported during the hand-supportable bar code reading mode of the system shown in FIG. 1.

Second Method of Manually-Triggered Bar Code Symbol Reading Supported by the Digital-Imaging Based Code Symbol Reading System In FIG. 6, there is shown a second method of manually-triggered bar code symbol reading supported by the digital-imaging based symbol reading system 1.

STEP 1: The symbol reading system is initialized, and the acceleration threshold is set in memory. The acceleration threshold can be measured in units of $[m/s^2]$, or equivalent units of measurement.

STEP 2: Upon detection that the trigger has been manually pulled, the symbol reading system takes an acceleration measurement during the current illumination and imaging period, and then automatically determines whether or not the current acceleration measurement exceeds the acceleration threshold.

STEP 3: If the acceleration measurement is below the acceleration threshold, then the symbol reading system captures a digital image of the object in the field of view (FOV), and attempts to read any bar code symbols that might be graphically represented in the captured digital image.

STEP 4: If the acceleration measurement exceeds the acceleration threshold, then the symbol reading system does not capture a digital image of the object in the FOV.

STEP 5: After the lapse of a predetermined time period, the code symbol reading system measures the acceleration level during the current illumination and imaging period.

STEP 6: If the acceleration measure is below the acceleration threshold level, then the symbol reading system captures another digital image and attempts to read a bar code symbol graphically encoded in the captured digital image.

STEP 7: If the system successfully reads a bar code symbol in the captured digital image, then symbol character data corresponding to the read bar code is transmitted to the host system; and if the system does not successfully read a bar code symbol in the captured digital image, then the system processes the digital image in effort to reduce motion blur prior to image-based bar code symbol decoding.

STEP 8: If the system successfully reads a bar code symbol in the captured digital image, then the system transmits corresponding symbol character data to the host system; and if the system fails to successfully read a bar code symbol in the captured digital image, then it awaits the occurrence of the next trigger event in the system.

Automatically-Triggered Methods of Bar Code Symbol Reading Operation

In FIG. 4B, the digital-imaging based system 1 is shown generating and projecting its linear targeting illumination beam 70 into the FOV 33 of the system upon automatic detection of an object within the FOV of the system, using the IR beams generated by the automatic IR-based motion detection and analysis subsystem 20. During this linear targeting mode of operation, a pair of substantially planarized illumination beams are generated about the FOV optics 34 on the PC board of the system, reflected off the FOV folding mirror 75, and ultimately projected out into the central portion of the FOV as a single linear targeting illumination beam 70 having high visibility characteristics to human beings.

When reading bar-coded objects such as consumer products, the user aligns the automatically-generated targeting illumination beam 70 with the barcode symbol on the object, and the bar code symbol is automatically detected by subsystem 20. Upon automatic detection of the bar code symbol, subsystems 21, 25, and 26 cooperate under the control of subsystem 30 to capture, buffer and process a digital image of the FOV (and all that it encompasses) in an effort to read the bar code symbol on the object, and when the bar code symbol is read, subsystem 27 transmits symbol character data to the host system, using the manually-triggered process shown in FIG. 7 or 8.

Figure 7:
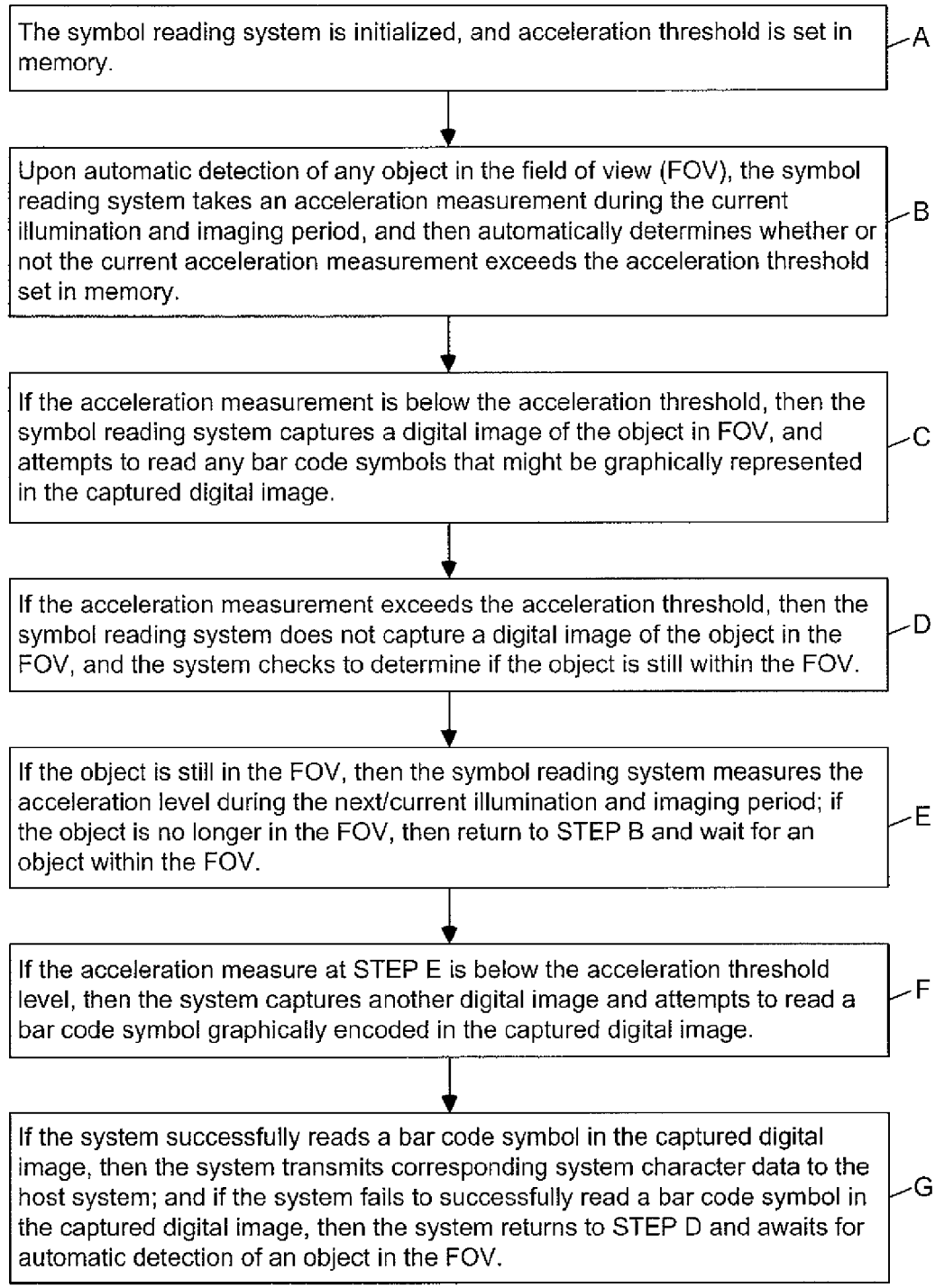
FIG. 7 is a flow chart setting forth the steps involved in carrying out the first method of automatically-triggered bar code symbol reading operation, supported during the hand-supportable bar code reading mode of the system shown in FIG. 1.

First Method of Automatically-Triggered Bar Code Symbol Reading Supported by the Digital-Imaging Based System In FIG. 7, there is shown a first method of automatically-triggered bar code symbol reading supported by the digital-imaging based system 1.

STEP 1: The symbol reading system is initialized, and the acceleration threshold is set in memory. The acceleration threshold can be measured in units of $[m/s^2]$, or equivalent units of measurement.

STEP 2: Upon automatic detection of any object in the field of view (FOV), the symbol reading system takes an acceleration measurement during the current illumination and imaging period, and then automatically determines whether or not the current acceleration measurement exceeds the acceleration threshold set in memory.

STEP 3: If the acceleration measurement is below the acceleration threshold, then the symbol reading system captures a digital image of the object in FOV, and attempts to read any bar code symbols that might be graphically represented in the captured digital image.

STEP 4: If the acceleration measurement exceeds the acceleration threshold, then the symbol reading system does not capture a digital image of the object in the FOV, and the system checks to determine if the object is still within the FOV.

STEP 5: If the object is still in the FOV, then the symbol reading system measures the acceleration level during the next/current illumination and imaging period; if the object is no longer in the FOV, then return to STEP 2 and wait for an object within the FOV.

STEP 6: If the acceleration measure at STEP 5 is below the acceleration threshold level, then the system captures another digital image and attempts to read a bar code symbol graphically encoded in the captured digital image.

STEP 7: If the system successfully reads a bar code symbol in the captured digital image, then the system transmits corresponding symbol character data to the host system; and if the system fails to successfully read a bar code symbol in the captured digital image, then the system returns to STEP 2 and awaits for automatic detection of an object in the FOV.

Figure 8:
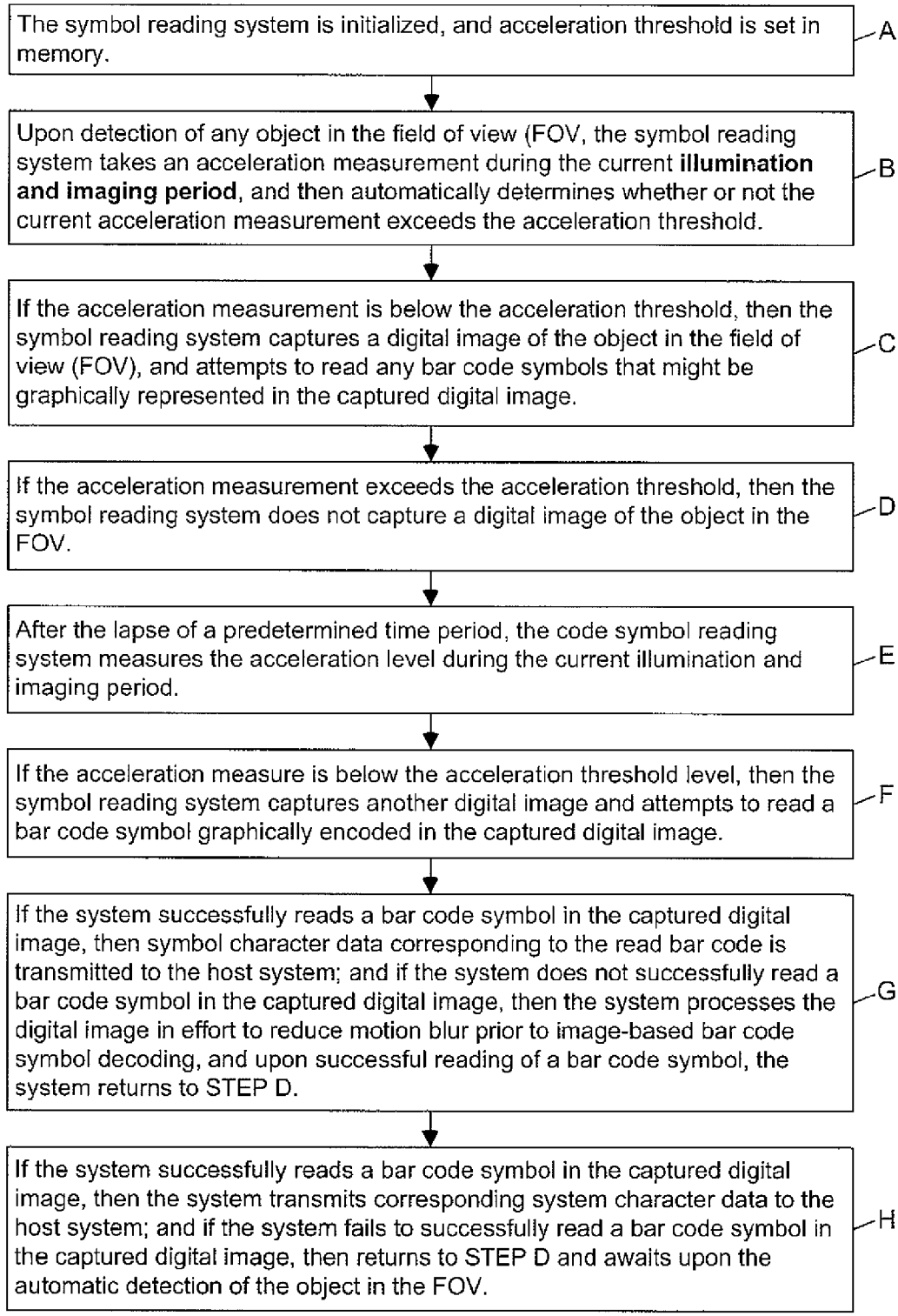
FIG. 8 is a flow chart setting forth the steps involved in carrying out the second method of manually-triggered bar code symbol reading operation, supported during the hand-supportable bar code reading mode of the system shown in FIG. 1.

Second Method of Automatically-Triggered Bar Code Symbol Reading Supported by the Digital-Imaging Based System In FIG. 8, there is shown a second method of automatically-triggered bar code symbol reading supported by the digital-imaging based system 1.

STEP 1: The symbol reading system is initialized, and the acceleration threshold is set in memory. The acceleration threshold can be measured in units of $[m/s^2]$, or equivalent units of measurement.

STEP 2: Upon detection of any object in the field of view (FOV, the symbol reading system takes an acceleration measurement during the current illumination and imaging period, and then automatically determines whether or not the current acceleration measurement exceeds the acceleration threshold.

STEP 3: If the acceleration measurement is below the acceleration threshold, then the symbol reading system captures a digital image of the object in the field of view (FOV), and attempts to read any bar code symbols that might be graphically represented in the captured digital image.

STEP 4: If the acceleration measurement exceeds the acceleration threshold, then the symbol reading system does not capture a digital image of the object in the FOV.

STEP 5: After the lapse of a predetermined time period, the code symbol reading system measures the acceleration level during the current illumination and imaging period.

STEP 6: If the acceleration measure is below the acceleration threshold level, then the symbol reading system captures another digital image and attempts to read a bar code symbol graphically encoded in the captured digital image.

STEP 7: If the system successfully reads a bar code symbol in the captured digital image, then symbol character data corresponding to the read bar code is transmitted to the host system; and if the system does not successfully read a bar code symbol in the captured digital image, then the system processes the digital image in an effort to reduce motion blur prior to image-based bar code symbol decoding, and upon successful reading of a bar code symbol, the system returns to STEP 2.

STEP 8: If the system successfully reads a bar code symbol in the captured digital image, then the system transmits corresponding symbol character data to the host system; and if the system fails to successfully read a bar code symbol in the captured digital image, then returns to STEP 2 and awaits upon the automatic detection of the object in the FOV.

Some Modifications which Readily Come to Mind

In alternative embodiments, the linear illumination array 23 employed within the illumination subsystem 22 may be realized using solid-state light sources other than LEDs, such as, for example, visible laser diode (VLDs) taught in great detail in WIPO Publication No. WO 02/43195 A2, published on May 30, 2002, and copending U.S. application Ser. No. 11/880,087 filed Jul. 19, 2007, assigned to Metrologic Instruments, Inc., and incorporated herein by reference in its entirety. However, when using VLD-based illumination techniques in the digital image capture and processing system of the present invention, great care must be taken to eliminate or otherwise substantially reduce speckle-noise generated at the image detection array 35 when using a coherent illumination source during object illumination and imaging operations. WIPO Publication No. WO 02/43195 A2, and U.S. patent application Ser. No. 11/880,087 filed Jul. 19, 2007, supra, disclose diverse methods of and apparatus for eliminating or substantially reducing speckle-noise during image formation and detection when using VLD-based illumination arrays.

Also, the linear illumination array can be realized using a combination of both visible and invisible illumination sources as taught in great detail in Applicants' copending U.S. application Ser. No. 11/880,087 filed Jul. 19, 2007, incorporated herein by reference in its entirety. The use of such spectral mixing techniques will enable the capture of images of bar code labels having high contrast, while using minimal levels of visible illumination.

While CMOS image detection array technology was described as being used in the preferred embodiments of the present invention, it is understood that in alternative embodiments, CCD-type image detection array technology, as well as other kinds of image detection technology, can be used.

While the illustrative embodiments of the present invention have been described in connection with various types of bar code symbol reading applications involving 1-D and 2-D bar code structures, it is understood that the present invention can be use to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. A digital-imaging based code symbol reading system comprising:
    a hand-supportable housing having a light transmission aperture;
    an image formation and detection subsystem, disposed in said hand-supportable housing, having image formation optics for producing and projecting a field of view (FOV) through said light transmission aperture and onto an area-type image detection array for detecting one or more 2D digital images of an object within said FOV, during object illumination and imaging operations;
    an automatic object detection subsystem, disposed in said hand-supportable housing, for automatically detecting the presence of an object within said FOV;
    an illumination subsystem, disposed in said hand-supportable housing, including a illumination array for producing a field of wide-area illumination within said FOV, and illuminating said object detected in said FOV, so that said illumination reflects off said object and is transmitted back through said light transmission aperture and onto said image detection array to detect said one or more 2D digital images of said object;
    an accelerometer-based motion detection subsystem, disposed in said hand-supportable housing, for measuring the acceleration of said housing while supported in the hand of said user, and comparing said acceleration measurement with a preset acceleration threshold stored in memory aboard said hand-supportable housing;
    an image capturing and buffering subsystem, disposed in said hand-supportable housing, for capturing and buffering said one or more 2D digital images detected by said image formation and detection subsystem;
    a digital image processing subsystem for processing said one or more 2D digital images captured and buffered by said image capturing and buffering subsystem and reading code symbols represented in said one or more 2D digital images;
    an input/output subsystem, disposed in said hand-supportable housing, for outputting processed image data to an external host system or other information receiving or, responding device; and
    a system control subsystem, disposed in said hand-supportable housing, for controlling and/or coordinating said subsystems during object detection, illumination and imaging operations, in response to the results of said accelerometer-based motion detection subsystem, so as to eliminate or reduce motion blur in said one or more digital images detected by said image formation and detection subsystem;
    wherein, in the event that said acceleration measurement is below said preset acceleration threshold, then said digital-imaging based code symbol reading system captures a digital image of the object in said FOV, and processes said digital image in an attempt to read any code symbol that might be graphically represented in said captured digital image;
    wherein, in the event that said acceleration measurement exceeds said preset acceleration threshold, then said digital-imaging based code symbol reading system refrains from capturing a digital image of the object in said FOV, and waits for said automatic object detection subsystem to detect once again the presence of said object in said FOV;
    wherein, in the event a subsequent trigger event has been detected, said digital-imaging based code symbol reading system automatically uses said accelerometer-based motion detection subsystem to make another acceleration measurement during the a current or subsequent illumination and imaging period;
    wherein, in the event that said acceleration measure is below said preset acceleration threshold, then said digital-imaging based code symbol reading system captures another digital image and processes the captured digital image to read a code symbol graphically encoded in said captured digital image;

wherein, in the event that said digital-imaging based code symbol reading system successfully reads a code symbol in said captured digital image, then said digital-imaging based code symbol reading system transmits corresponding symbol character data to a said external host system or other information receiving device; and wherein, in the event that said digital-imaging based code symbol reading system fails to successfully read a code symbol in said captured digital image, then said digital-imaging based code symbol reading system awaits for said automatic object detection subsystem to detect once again the presence of an object in said FOV.

2. The digital-imaging based code symbol reading system of claim 1, wherein said automatic object detection subsystem controls the automatic generation of a linear targeting illumination beam prior to wide-area field of view (FOV) illumination during digital imaging operations.

3. The digital-imaging based code symbol reading system of claim 1, which further comprises an illumination control subsystem, disposed in said hand-supportable housing, for controlling the operation of said illumination array within said illumination subsystem.

4. The digital-imaging based code symbol reading system of claim 1, wherein said illumination subsystem comprises an array of LEDs.

5. The digital-imaging based code symbol reading system of claim 1, wherein said accelerometer-based motion detection subsystem comprises an acceleration sensor chip mounted in said hand-supportable housing.

6. A digital-imaging based code symbol reading system comprising:
a hand-supportable housing having a light transmission aperture;
an image formation and detection subsystem, disposed in said hand-supportable housing, having image formation optics for producing and projecting a field of view (FOV) through said light transmission aperture and onto an area-type image detection array for detecting one or more 2D digital images of an object within said FOV, during object illumination and imaging operations;
a manually-actuatable trigger switch integrated said hand-supportable housing, for automatically initiating the detection of one or more 2D digital images of the object in said FOV, in response to the user of said system actuating said manually-actuatable trigger switch;
an illumination subsystem, disposed in said hand-supportable housing, including an illumination array for producing a field of wide-area illumination within said FOV, and illuminating said object detected in said FOV, so that said illumination reflects off said object and is transmitted back through said light transmission aperture and onto said image detection array to form said one or more 2D digital images of said object;
an accelerometer-based motion detection subsystem, disposed in said hand-supportable housing, for measuring the acceleration of said hand-supportable housing while supported in the hand of said user, and comparing said acceleration measurement with a preset acceleration threshold stored in memory aboard said hand-supportable housing;
an image capturing and buffering subsystem, disposed in said hand-supportable housing, for capturing and buffering said one or more 2D digital images detected by said image formation and detection subsystem;
a digital image processing subsystem for processing said one or more 2D digital images captured and buffered by said image capturing and buffering subsystem and reading code symbols represented in said one or more 2D digital images;
an input/output subsystem, disposed in said hand-supportable housing, for outputting processed image data to an external host system or other information receiving or responding device; and
a system control subsystem, disposed in said hand-supportable housing, for controlling and/or coordinating said subsystems during object detection, illumination and imaging operations, in response to the results of said accelerometer-based motion detection subsystem, so as to eliminate or reduce motion blur in said one or more digital images detected by said image formation and detection subsystem;
wherein, in the event that said acceleration measurement is below said preset acceleration threshold, then said digital-imaging based code symbol reading system captures a digital image of the object in said FOV, and processes said digital image in an attempt to read any code symbol that might be graphically represented in said captured digital image;
wherein, in the event that said acceleration measurement exceeds said preset acceleration threshold, then said digital-imaging based code symbol reading system refrains from capturing a digital image of the object in said FOV, and waits for said manually-actuatable trigger switch to be manually actuated again;
wherein, in the event that said manually-actuatable trigger switch has been manually actuated once again, said digital-imaging based code symbol reading system automatically uses said accelerometer-based motion detection subsystem to make another acceleration measurement during a current or subsequent illumination and imaging period;
wherein, in the event that said acceleration measure is below said preset acceleration threshold, then said digital-imaging based code symbol reading system captures another digital image and processes the captured digital image to read a code symbol graphically encoded in said captured digital image;
wherein, in the event that said digital-imaging based code symbol reading system successfully reads a code symbol in said captured digital image, then said digital-imaging based code symbol reading system transmits corresponding symbol character data to said external host system or other information receiving device; and
wherein, in the event that said digital-imaging based code symbol reading system fails to successfully read a code symbol in said captured digital image, then said digital-imaging based code symbol reading system awaits for said manually-actuatable trigger switch to be manually actuated once again.

7. The digital-imaging base code symbol reading system of claim 6, which further comprises an illumination control subsystem, disposed in said hand-supportable housing, for controlling the operation of said illumination array within said illumination subsystem.

8. The digital-imaging based code symbol reading system of claim 6, wherein said illumination subsystem comprises an array of LEDs.

9. The digital-imaging based code symbol reading system of claim 6, wherein said accelerometer-based motion detection subsystem comprises an acceleration sensor chip mounted in said hand-supportable housing.

10. A method of code symbol reading comprising the steps of:
(a) providing a digital-imaging based code symbol reading system having a hand-supportable housing, a field if view (FOV) defined relative to said hand-supportable housing, memory disposed in said hand-supportable housing, and an acceleration sensor disposed in said hand-supportable housing;
(b) initializing said digital-imaging based code symbol reading system and setting an acceleration threshold in said memory;
(c) upon detection of a trigger event, said digital-imaging based code symbol reading system automatically using said acceleration sensor to make an acceleration measurement during a current illumination and imaging period, and then automatically determining whether or not the current acceleration measurement exceeds said acceleration threshold set in memory;
(d)(1) in the event that said acceleration measurement made at step (c) is below said acceleration threshold, then said digital-imaging based code symbol reading system capturing a digital image of the object in said FOV, and processing said digital image in an attempt to read any code symbol that might be graphically represented in said captured digital image;
(d)(2) in the event that said acceleration measurement made at step (c) exceeds said acceleration threshold, then said digital-imaging based code symbol reading system refrains from capturing a digital image of the object in said FOV, and waits for said trigger event to be detected again;
(e) when a subsequent trigger event has been detected, said digital-imaging based code symbol reading system automatically using said acceleration sensor to make another acceleration measurement during a current or subsequent illumination and imaging period;
(f) in the event that said acceleration measure made at step (e) is below the acceleration threshold level, then said digital-imaging based code symbol reading system capturing another digital image and processing the captured digital image to read a code symbol graphically encoded in said captured digital image;
(g)(1) in the event that said digital-imaging based code symbol reading system successfully reads a code symbol in said captured digital image, then said digital-imaging based code symbol reading system transmitting corresponding symbol character data to a host system; and
(g)(2) in the event that said digital-imaging based code symbol reading system fails to successfully read a code symbol in said captured digital image, then said digital-imaging based code symbol reading system awaits for the occurrence of a subsequent trigger event in said digital-imaging based code symbol reading system.

11. The method of claim 10, wherein said trigger event is manually initiated by manually depressing a trigger switch disposed on said hand-supportable housing when an, object is present in said FOV.

12. The method of claim 10, wherein said trigger event is automatically initiated by automatic detection of an object in said FOV.

13. The method of claim 10, wherein said code symbol is a code symbol selected from the group consisting of 1D bar code symbologies, 2D bar code symbologies, and data matrix symbologies.

14. A method of code symbol reading comprising the steps of:
(a) providing a digital-imaging based code symbol reading system having a hand-supportable housing, a field if view (FOV) defined relative to said hand-supportable housing, memory disposed in said hand-supportable housing, and an acceleration sensor disposed in said hand-supportable housing;
(b) initializing said digital-imaging based code symbol reading system and setting an acceleration threshold in said memory;
(c) upon detection of a trigger event, said digital-imaging based code symbol reading system automatically using said acceleration sensor to make an acceleration measurement during a current illumination and imaging period, and then automatically determining whether or not the current acceleration measurement exceeds said acceleration threshold set in memory;
(d)(1) in the event that said acceleration measurement made at step (c) is below said acceleration threshold, then said digital-imaging based code symbol reading system capturing a digital image of the object in said FOV, and processing said digital image in an attempt to read any code symbol that might be graphically represented in said captured digital image;
(d)(2) in the event that said acceleration measurement made at step (c) exceeds said acceleration threshold, then said digital-imaging based code symbol reading system refrains from capturing a digital image of the object in said FOV, and waits for said trigger event to be detected again;
(e) when a first subsequent trigger event has been detected, said digital-imaging based code symbol reading system automatically using said acceleration sensor to make another acceleration measurement during a current or subsequent illumination and imaging period;
(f) in the event that said acceleration measure made at step (e) is below the acceleration threshold level, then said digital-imaging based code symbol reading system capturing another digital image and processing the captured digital image to read a code symbol graphically encoded in said captured digital image;
(g)(1) in the event, that said digital-imaging based code symbol reading system successfully reads a code symbol in said captured digital image, then said digital-imaging based code, symbol reading system transmitting corresponding symbol character data to a host system;
(g)(2) in the event that said digital-imaging based code symbol reading system does not successfully read a code symbol in said captured digital image, then said digital-imaging based code symbol reading system processes said digital image in an effort to reduce motion blur prior to image-based code symbol decoding, and upon successful reading of a code symbol graphically represented in said captured digital image, said digital-imaging based code symbol reading system returns to step (c) and awaits for the occurrence of a second subsequent trigger event in said digital-imaging based code symbol reading system.

15. The method of claim 14, wherein said trigger event is manually initiated by manually depressing a trigger switch disposed on said hand-supportable housing when an object is present in said FOV.

16. The method of claim 14, wherein during step (c) said trigger event is automatically initiated by automatic detection of an object in said FOV; wherein during step (e), said first subsequent trigger event is detected by automatic detection of said object in said FOV; and wherein during step (g)(3), said second subsequent trigger event is detected by automatic detection of said object present in said FOV.

17. The method of claim 14, wherein said code symbol is a code symbol selected from the group consisting of 1D bar code symbologies, 2D bar code symbologies, and data matrix symbologies.

\* \* \* \* \*